United States Patent Office 3,558,555
Patented Jan. 26, 1971

3,558,555
CHLOROPRENE POLYMERS CONTAINING ALPHA, OMEGA - BIS - CYCLOPENTADIENYL ANTIOZONANTS
Wilhelm Franz Gruber, Wilmington, Del., assignor to E. I. du Pont de Nemours and Company, Wilmington, Del., a corporation of Delaware
No Drawing. Filed Oct. 31, 1968, Ser. No. 772,420
Int. Cl. C08f 45/58
U.S. Cl. 260—45.95          8 Claims

ABSTRACT OF THE DISCLOSURE

Elastomeric chloroprene polymers, for use under severe flexing and stretching conditions and particularly at elevated temperatures, are given enhanced stability against deterioration by ozone by incorporating therein about from 1 to 15 parts, per 100 parts of chloroprene polymer, of an alpha,omega-bis-cyclopentadienyl compound having the structure:

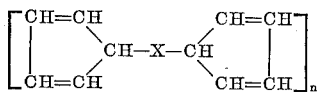

wherein $n$ is a number from 1 to 10 and X is a divalent carbon-containing radical from the group consisting of (a) α,α'-p-xylylene

(b) α,α'-m-xylylene

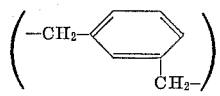

(c) 4,4'-biphenylenedimethylene

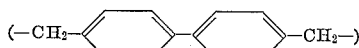

(d) 4,4'-oxydiphenylenedimethylene

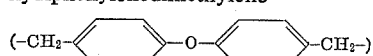

and (e) aliphatic radicals, containing up to 20 carbon atoms, which may be branched, unbranched, saturated or unsaturated cyclic or acyclic containing from 0 to five intralinear oxygen atoms.

BACKGROUND OF THE INVENTION

Although elastomeric chloroprene polymers are exceptionally resistant to attack by atmospheric ozone, it is often desirable to render them even more stable in this regard. In certain applications in which the elastomer is flexed or stretched particularly at elevated temperatures, it is relatively susceptible to deterioration by ozone. Even in uses in which the elastomer remains static, local high concentrations of ozone in the atmosphere may increase the susceptibility of the elastomer to attack.

Various compounds are known to have antiozonant activity in chloroprene polymers, but their use is often accompanied by adverse effects on the compounded or cured elastomers. One problem often encountered, for example, is poor storage stability of compounded stocks— that is, the compounded elastomers tend to increase in viscosity during storage, presumably because of premature chain extension or cross-linking. Another disadvantage often encountered is the tendency of stocks containing certain antiozonants either to develop undesirable color or to stain substrates in contact with the compounded elastomers.

SUMMARY

Now according to the present invention it has been found that the foregoing and related problems are substantially avoided and elastomeric chloroprene polymers stabilized against ozone degradation to a high degree are produced by incorporating into 100 parts by weight of the polymers about 1 to 15 parts by weight of an alpha, omega-bis-cyclopentadienyl compound having the formula:

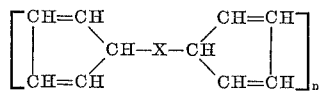

where $n$ is a number from 1 to 10 and X is a divalent carbon containing radical from the group consisting of (a) α,α'-p-xylylene

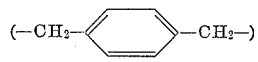

(b) α,α'-m-xylylene

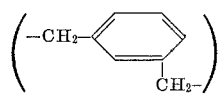

(c) 4,4'-biphenylenedimethylene

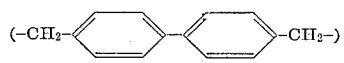

(d) 4,4'-oxydiphenylenedimethylene

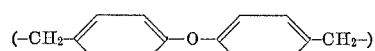

and (e) aliphatic radicals, containing up to 20 carbon atoms, which may be branched, unbranched, saturated or unsaturated cyclic or acyclic containing from 0 to 5 intralinear oxygen atoms.

DESCRIPTION OF THE PREFERRED EMBODIMENTS

The antiozonant compounds used in the present invention can be prepared by reacting the selected dihalide with a metallic derivative of cyclopentadiene, such as cyclopentadienyl sodium or cyclopentadienyl potassium. A discussion of the method is given in U.S. Pat. 2,726,232 to Upson and U.S. Pat. 3,210,331 to Renner. These methods can be adapted to the preparation of compounds other than those disclosed in these references by using the appropriate dihalide compound as a starting material. The number of carbon atoms in the group represented by X may be from one up to a practical but not critical upper limit of about 20.

As discussed in the Upson Pat. 2,726,232, the monomeric compounds in which $n$ is 1 readily polymerize by a Diels-Alder reaction. The compounds usually prepared are mixtures in which an average of 2 to 5 monomer units have joined to form a compound believed to have the general structure shown in column 2 of that patent except that R is the approximate X radical. Mixtures of this type are preferred because they are less volatile than the monomer. If the polymer contains more than about 10 units, it becomes less suitable because it is not soluble in the chloroprene polymer in to which it is to be incorporated, and therefore is unable to exert its antiozonant activity.

The polymerization to the desired degree can be effected by bulk, solution, or emulsion polymerization. It is more convenient to effect polymerization in bulk by allowing the material to stand in an inert atmosphere at 25–200° C. for 2 to 10 hours. Other methods are described in U.S. Pat. 2,726,232.

The amount of the antiozonant to be used in the chloroprene polymers ranges from about 1 to about 15 parts by weight per 100 parts by weight of polymer. At least about 1 part is required in order to produce a significant effect. More than about 15 parts is not practical because in these large amounts the antiozonant adversely affects the tensile properties of the elastomer. The preferred amount ranges from about 2 to about 5 parts.

The chloroprene polymers in which the antiozonants are used are homopolymers of chloroprene 2-chloro-1,3-butadiene) and copolymers of chloroprene with up to an equal weight thereof of a monomer or monomers copolymerizable with chloroprene. Suitable copolymerizable monomers are compounds of the following representative types: vinyl-substituted aromatic compounds, such as styrene, vinyltoluenes, and vinylnaphthylenes; acrylic and methacrylic acids and derivatives thereof such as esters and nitriles, e.g., methyl methacrylate and acrylonitrile; and conjugated diolefinic compounds such as 1,3-butadiene, isoprene, and 2,3-dichloro-1,3-butadiene.

The chloroprene polymers can be of the sulfur modified type or can be of the type containing no sulfur.

Various commercially available chloroprene polymers, in all of which the antiozonants of this invention are useful, are described in Encyclopedia of Polymer Science and Technology, vol. 3, pp. 705–730, Interscience Publishers (1965).

The antiozonant can be used with such other conventional compounding ingredients as antioxidants, vulcanization accelerators, fillers and reinforcing agents. For a discussion of methods of compounding chloroprene polymers see, for example, Murray and Thompson, "The Neoprenes," Elastomer Chemicals Department, E. I. du Pont de Nemours and Co., copyright 1963.

The antiozonant compound can be added to the chloroprene polymer along with the other compounding ingredients using standard compounding techniques. Alternatively, it can be incorporated into the latex before the polymer is isolated. This can be accomplished, for example, by dissolving the antiozonant in a suitable solvent, such as an aromatic hydrocarbon, emulsifying this solution with water, adding the emulsion to the elastomer latex, co-coagulating the emulsion solids, isolating, and drying.

The antiozonants of this invention provide excellent protection against attack by ozone without significantly increasinging the tendency of the compound stock to cross-link prematurely during storage. Chloroprene polymers containing the antiozonants are non-staining and do not discolor substrates to any significant degree. The cured elastomers containing the antiozonants, particularly in the preferred amounts, show essentially no decrease in tensile properties.

The invention will be better understood by reference to the following illustrative examples.

EXAMPLES

In the following prepartions A–E the compounds have the general structure:

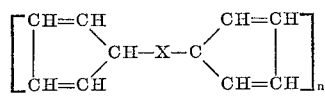

Preparation A

Compound in which X is —$CH_2CH=CH—CH_2$— and $n$ averages about 2.

Monomer name: 1,4 - di - 2,4-cyclopentadien-1-yl-2-butene.

Sodium (46 g., 2 moles) is finely dispersed by melting under 350 ml. of xylene and vigorously agitating for 5 minutes under a blanket of nitrogen. The mixture is cooled to 35–40° C., and 1 to 2 ml. of absolute ethanol are added as activator. Freshly distilled cyclopentadiene (160 g., 198 ml., 2.4 moles) is added dropwise from a funnel. Temperature is maintained at about 40° C. with cooling. Addition of the cyclopentadiene is carried out over a period of about 2 hours, and stirring is continued for an additional hour. After lowering the temperature to 30–35° C., freshly distilled 1,4-dichloro-2-butene (125 g., 99 ml., 1 mole) is added dropwise at such a rate that the temperature does not exceed 40° C. External cooling with ice water is necessary. After reaction has subsided, the mixture is heated to 100–110° C. for 3 hours. After cooling to room temperature, the precipitated sodium chloride is collected on a Büchner funnel, reslurried several times in xylene to remove absorbed organic material, and discarded. The clear filtrate is stripped of xylene by vacuum distillation at a bath temperature of 60° C. 153 grams of product is obtained (68% of theoretical).

Analyses show the following:

| | Calculated ($C_{14}H_{18}$) | Found |
|---|---|---|
| Molecular weight | 184 | 362 |
| Double bonds | 5 | 4.15 |
| Molecular weight per double bond | 37 | 87 |

Preparation B

This compound is made essentially as described under Preparation A except that instead of heating the mixture for 3 hours at 100–110° C., it is heated for 5 hours at 40–45° C. The molecular weight is about 938 and thus $n$ is about 5.

Preparation C

Compound in which X is —$CH_2CH_2CH_2CH_2$— and $n$ averages about 1.6.

Monomer name: 1,4-di-2,4-cyclopentadien-1-ylbutane.

A suspension of cyclopentadienyl sodium is prepared by reacting 28 g. (1.22 grams atom) of sodium and 97 g. (120 ml., 1.46 mole) of cyclopentadiene in 300 ml. of xylene as described under Preparation A above. To this suspension is added 1,4-dibromobutane (123 g., 68 ml., 0.57 mole) which is added dropwise while maintaining the temperature at 40–45° C. The reaction is completed by heating at 105° C. for 3 hours. Work-up is carried out as described in Preparation A above. 61.5 grams of product are obtained (62.5% of theoretical based on 1,4-dibromobutane) which is a brown, viscous liquid. Analyses show the following:

| | Calculated ($C_{14}H_{18}$) | Found |
|---|---|---|
| Molecular weight | 186 | 295, 298 |
| Molecular weight per double bond | 46.5 | 93, 92 |

Preparation D

Compound in which X is

and $n$ averages about 2.4.

Monomer name: α,α'-di-2,4-cyclopentadien-1-yl-p-xylene.

Cyclopentadienyl sodium is prepared as described in Preparation B except that 600 ml. of xylene is used. α,α'-Dichloro-p-xylene (107 g., 0.61 mole) is added while maintaining the temperature at 50° C. After addition is complete the temperature is raised to 120° C. and held for 3 hours to complete the reaction. Work-up is carried out as described in Preparation A. The yield is 84 g. (59%) of product. The molecular weights determined are 563 and 572 as compared with a calculated molecular weight of 234 for $C_{18}H_{18}$.

Preparation E

Compound similar to D except that $n$ is about 4.

In this experiment the preparation is carried out as in D above except that instead of heating 3 hours at 120° C. heating is carried out at 55–60° C. for 6 hours. The molecular weight of the product is about 955, indicating that $n$ is about 4.

The testing methods used in the examples herein below are as follows:

The Mooney scorch properties of the compounded stock are measured at 121° C. immediately after mixing and after aging for two weeks at 38° C. The testing is carried out by ASTM Method D1646–61 using the small rotor. Bin storage stability of the compounded stock is evaluated by comparing the minimum viscosity reading before and after storage. An increase in the value of this reading during storage indicates that premature cross-linking has occurred. "Scorchiness" of the compounded stock is evaluated by the length of time required for a 10-point rise above the minimum reading (measured from the start of the test). Safety in processing is directly proportional to the length of time required for this 10-point rise to occur. In these tests, scorchiness is measured to determine whether the antiozonants have an adverse effect on processing safety.

For the remaining tests, samples of the compounded stock are cured in a press at 153° C. for 20 minutes (unless otherwise stated).

The antiozonant effect is measured by exposing cured samples to ozone in a test chamber at 40° C. using an ozone concentration of 3 parts per million. For static exposures, samples of the vulcanizates, 0.25 x 0.075 x 6 inches in dimension, mounted on varnished wooden racks, are subjected to tensile strains of 20 percent and 40 percent, respectively. The dynamic tests are carried out by the "roller" method described in Rubber Chemistry and Technology, 32, 1119 (1959). The test pieces are flexed at a rate of 30 cycles per minute. The number of hours required to produce a certain degree of cracking is observed.

The stress/strain properties are measurd by ASTM Method D412–64T. Hardness (durometer A) is measured at 24° C. by ASTM Method D2240–64T. These properties are measured to show any adverse effects of the antiozonant.

Example 1

In this example the chloroprene polymer is prepared as described in Example 1 of U.S. Pat. 2,914,497. A compounded stock is prepared using the following recipe:

|  | Parts by wt. |
|---|---|
| Chloroprene polymer | 100. |
| Stearic acid | 0.5. |
| 2,2'-methylenebis(6-tert-butyl-p-cresol) (an antioxidant) | 2. |
| Magnesia | 4. |
| Suprex clay | 90. |
| Titanium dioxide | 10. |
| Petrolatum | 1. |
| Zinc oxide | 5. |
| 2-mercapto-2-imidazoline | 0.75. |
| Tetramethylthiuram disulfide | 0.5. |
| Process oil | As shown. |
| Antiozonant of Preparation A | As shown. |

Table I shows the results of the tests.

TABLE I

|  |  | Control |  | A commercial antiozonant |
|---|---|---|---|---|
| Light process oil a | 6 | 0 | 12 | 0 |
| Antiozonant, parts by weight | 6 | 12 | 0 | 12 |
| Mooney Scorch: |  |  |  |  |
| As mixed: |  |  |  |  |
| Minimum viscosity points | 16 | 16 | 16 | 14 |
| Minutes to 10-point rise | 17 | 16 | 17 | 14 |
| After 2 weeks at 38° C.: |  |  |  |  |
| Minimum viscoisty, points | 20 | 22 | 25 | 21 |
| Minutes to 10-point rise | 14 | 16 | 13 | 9 |
| Ozone Resistance: |  |  |  |  |
| Dynamic exposure, hours to considerable cracking | 77 | 166 | 8 | 77 | a Added to obtain compounded stocks of equivalent softness.

In static ozone exposure tests, none of the vulcanizates containing the antiozonant show cracks after an exposure of 600 hours. In contrast, the control samples fail after 28 hours at 20% strain and after 21 hours at 40% strain.

Cured samples containing the antiozonant do not stain acrylic enamel surfaces after contact for 24 hours at 70° C. or after contact for 24 hours under a sunlamp. After standing for 6 weeks in a window facing southwest, the test samples are cream colored whereas the control sample is light brown. Filter papers in contact with the test samples during this time show no staining.

Equivalent results are obtained when the antiozonant of Preparation B is tested in the same way.

Example 2

In this example the chloroprene polymer and the antiozonant are the same as in Example 1. The following compounding recipe is used.

|  | Parts by wt. |
|---|---|
| Chloroprene polymer | 100. |
| Stearic acid | 0.5. |
| Magnesia | 4. |
| 2,2'-methylenebis(6-tert-butyl-p-cresol) | 2. |
| Semi-reinforcing furnace black | 58. |
| Light process oil | 10. |
| Zinc oxide | 5. |
| 2-mercapto-2-imidazoline | 0.75. |
| Tetramethylthiuram disulfide | 0.75. |
| Antiozonant | As shown. |

Table II shows the results of the tests.

TABLE II

|  |  |  | Control | Commercial antiozonant |
|---|---|---|---|---|
| Antiozonant, parts | 2 | 4 | 0 | 4 |
| Mooney Scorch: |  |  |  |  |
| As mixed: |  |  |  |  |
| Minimum viscosity, points | 20 | 18 | 22 | 19 |
| Minutes to 10-point rise | 14 | 14 | 13 | 12 |
| After 2 weeks at 38° C.: |  |  |  |  |
| Minimum viscosity, points | 24 | 22 | 33 | 25 |
| Minutes to 10-point rise | 13 | 13 | 11 | 10 |
| Ozone resistance: |  |  |  |  |
| Dynamic exposure, hours to considerable cracking | 28 | 49 | 12 | 23 |
| Stress/strain and hardness at 24° C.: |  |  |  |  |
| Modulus at 100% elongation, p.s.i. | 525 | 450 | 550 | 550 |
| Tensile strength at break, p.s.i. | 3,025 | 2,800 | 2,925 | 2,825 |
| Elongation at break, percent | 310 | 320 | 290 | 290 |
| Hardness, durometer A | 68 | 66 | 69 | 66 |

In static ozone exposure tests none of the vulcanizates containing the antiozonant show cracks after an exposure of 600 hours. In contrast, the control samples fail after 48–50 hours at 20% or 40% strain.

Example 3

Compounded stocks are prepared using the following recipe:

|  | Parts by wt. |
|---|---|
| Chloroprene polymer (same as in Example 1) | 100 |
| Magnesia | 4 |
| 2,2'-methylenebis(6-tert-butyl-p-cresol) | 2 |
| Suprex clay | 90 |
| Titanium dioxide | 10 |
| Zinc oxide | 5 |
| 2-mercapto-2-imidazoline | 0.75 |
| Process oil | 12 minus weight of antiozonant. |
| Antiozonant | As shown. |

Test samples are cured in a press for 25 minutes at 153° C.

Table III shows the results of the dynamic ozone tests.

TABLE III

| Antiozonant | | | | | | | |
|---|---|---|---|---|---|---|---|
| Prepared as described above in paragraph | C | D | D | E | E | [1]None | Commercial antiozonant |
| Parts | 4 | 2 | 4 | 2 | 4 | 0 | 2 | 4 |
| Hours to appreciable cracking | 39 | 20 | 40 | 19 | 38 | 3-8 | 4 | 20 |

[1] Control.

None of the test samples show cracks after 600 hours of static testing at 20% stress, whereas the control sample breaks after 23 hours.

Example 4

In this example a chloroprene polymer latex is prepared essentially as described in Example 1 of U.S. 2,914,497. The antiozonant is added to the latex after unreacted chloroprene has been removed and before drum drying. The antiozonant is added as an emulsion prepared by emulsifying a solution of the antiozonant in xylene (3.34 g. in 10 ml. of solution) with an equal volume of latex using the potassium salt of wood rosin as an emulsifying agent. This emulsion is then added to the latex to give the desired concentration of antiozonant. The chloroprene polymer containing the antiozonant is isolated on a 12-inch chromium plated double drum dryer.

The same compounding recipe is used as in Example 3. Vulcanization is carried out for 15 minutes at 153° C.

In this example the antiozonant is prepared as in Preparation D except that the $\alpha,\alpha'$-dichloroxylene is derived from mixed xylenes having the following composition:

| | Percent by weight |
|---|---|
| p-Xylene | 28 |
| m-Xylene | 58 |
| o-Xylene | 13 |
| Toluene | 1 |

The final compound has a molecular weight of 697 ($n$ is 3). The compound contains an average of 3.2 double bonds (determined by reaction with bromine) and thus has a weight of 218 grams per double bond.

Table IV shows the results of the dynamic ozone exposure tests.

TABLE IV

| Parts of antiozonant, per 100 parts of polychloroprene | 2 | 4 | [1]0 |
|---|---|---|---|
| Hours to trace cracking | 4 | 14 | 2 |
| Hours to appreciable cracking | 8 | 23 | 4 |
| Hours to very bad cracking | 29 | 51 | 14 |
| Hours to break | 44 | 56 | 27 |

[1] Control.

In the static ozone tests neither of the test vulcanizates shows traces of cracks after 100 hours of exposure (termination of the test). In contrast, the control sample breaks after 35 hours of exposure.

Example 5

This example shows results obtained when the following compounds are tested:

(5A) $X=-CH_2-\langle\phantom{x}\rangle-\langle\phantom{x}\rangle-CH_2-$ n=3.5

(5B) $X=-CH_2-\langle\phantom{x}\rangle-O-\langle\phantom{x}\rangle-CH_2-$ n=2.2

(5C) $X=CH_2CH_2OCH_2CH_2-$ n=17

(5D) $X=-CH_2CH_2(OCH_2CH_2)_3-OCH_2CH_2-$ n=1

(5E) $X=-CH_2-\langle\phantom{x}\rangle$ n=2.8, with $CH_2-$ (5F)  $X=-CH_2-\langle S \rangle-CH_2-$ n=1.4

The compounds are prepared as follows:

(5A) 4,4'-bis(chloromethyl)biphenyl is prepared as described in U.S. Pat. 3,007,975. Cyclopentadienyl sodium is prepared as described in Preparation A. using 23 g. of sodium and 77 g. (96 ml.) of cyclopentadiene in 300 ml. of xylene. To this solution is added 156 g. of 4,4'-bis(chloromethyl)biphenyl as a partial solution in 1500 ml. of xylene. After the initial reaction has subsided the mixture is heated for 5 hours at 110° C. The product is worked up as in Preparation A. 57 g. of material is obtained which has a molecular weight of 1070 ($n=3.5$).

(5B) Bis(4-chloromethylphenyl) ether is prepared as described in Arch. Pharm., 286, 289 (1963) (C.A. 49, 3989i). The following materials are used:

| | G. |
|---|---|
| Diphenyl ether | 170 |
| Paraformaldehyde | 90 |
| Anhydrous zinc chloride | 20 |
| Glacial acetic acid | 500 |

Hydrogen chloride gas is added for 8 hours at 20–30° C. while vigorously stirring. The fraction boiling at 166–175° C. at 0.1 mm. Hg is collected.

23 g. of sodium sand and 96 ml. of cyclopentadiene in 300 ml. of xylene are reacted overnight in a nitrogen atmosphere. 135 grams of the crude bis(4-chloromethylphenyl)ether dissolved in 970 ml. of xylene are reacted with the cyclopentadienyl sodium in the presence of 2 g. of sodium iodide and 0.2 g. of N-phenyl-2-naphthylamine. After addition of the ether the reaction mass is held at 110° C. for 3 hours. The product is worked up in the usual way. 105 grams of xylene-soluble product are obtained having a molecular weight of 724 ($n=2.2$).

(5C) Cyclopentadienyl sodium is prepared as described in Preparation A (at the beginning of the examples) using 46 g. of sodium, 134 g. of cyclopentadiene, and 600 ml. of xylene. 143 grams of bis(2-chloroethyl) ether, 2 g. of sodium iodide, and 0.5 g. of N-phenyl-2-naphthylamine are added. After addition of the bis(2-chloroethyl) ether is complete, the mixture is refluxed for 5 hours. The product is worked up as described in Preparation A. About 18 g. of product are obtained having a molecular weight of 337 ($n=1.7$).

(5D) Cyclopentadienyl sodium is prepared from 16 g. of sodium and 66 g. of cyclopentadiene in 200 ml. of xylene. To this solution are added 95 g. of freshly distilled pentaethylene ether dichloride $[ClCH_2CH_2(OCH_2CH_2)_3OCH_2CH_2Cl]$ in 200 ml. of xylene. 0.3 gram of N-phenyl-2-naphthylamine is added. After addition of the pentaethylene ether dichloride, the mixture is heated at 110° C. for 4 hours. The product is worked up in the usual fashion. 40 grams of product as a viscous colorless oil having a molecular weight of 339 ($n=1$) are obtained.

(5E) Cyclopentadienyl sodium is prepared by reacting 17.5 g. of sodium sand with 60 g. of cyclopentadiene in 300 ml. of xylene. To this reaction mixture are added 100 g. of $\alpha,\alpha'$-dibromo-m-xylene in 490 ml. of xylene at 50° C. After addition is complete, the reaction mass is heated at 110° C. for four hours. The product is worked up as usual. It has a molecular weight of 666 ($n=2.8$).

(5F) 1,4-bis(chloromethyl)cyclohexane is prepared by refluxing 296 g. of 1,4-cyclohexanedimethanol with 500 g. of thionyl chloride and 339 ml. of pyridine in 1750 ml. of benzene. The reaction mass is washed with 500 ml. of distilled water and twice with aqueous sodium bicarbonate (5 g. in 500 ml. of water). The product is dried over calcium chloride and vacuum distilled. 201.7 grams of product are obtained.

The 1,4-bis(chloromethyl)cyclohexane is reacted with cyclopentadienyl sodium prepared from 25.3 g. of sodium and 100 g. of cyclopentadiene in 500 ml. of xylene. 3 grams of sodium iodide are added to promote coupling. The reaction mixture is refluxed for about 2.5 hours and then cooled, made acid with concentrated HCl, and washed with water. The xylene-soluble portion yields 99.0 g. of an orange semi-viscous liquid. The molecular weight is 340 ($n=1.4$).

Compounded stocks are prepared as described in Example 3 using 2 parts of the antiozonant in the formulation unless otherwise noted.

Table V shows the results of the tests.

TABLE V

| | Antizonant | | | | | | |
|---|---|---|---|---|---|---|---|
| | 5A | 5B | 5C | 5D | 5E a | 5F | Control (none) |
| Static tests: | | | | | | | |
| Hours to trace cracking | >600 | >600 | >600 | >600 | >600 | >600 | <2 |
| Dynamic test: | | | | | | | |
| Hours to considerable cracking | 12 | 11 | 28 | 11 | 18 | 14 | 7 | a 3 parts used in the compounding recipe.

What is claimed is:

1. An ozone-resistant elastomeric composition comprising, by weight, 100 parts of a chloroprene polymer and about from 1 to 15 parts of an alpha,omega-bis-cyclopentadienyl compound having the structure $$\left[\begin{array}{cc} \text{CH}=\text{CH} & \text{CH}=\text{CH} \\ | \quad \diagdown\text{CH}-\text{X}-\text{CH}\diagup \quad | \\ \text{CH}=\text{CH} & \text{CH}=\text{CH} \end{array}\right]_n$$

wherein $n$ is a number from 1 to 10 and X is a divalent carbon containing radical from the group consisting of (a) α,α'-p-xylylene

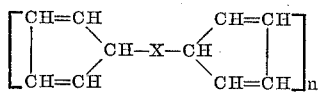

(b) α,α'-m-xylylene

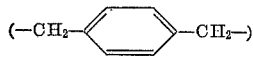

(c) 4,4'-biphenylenedimethylene

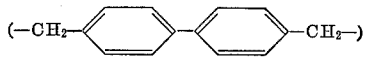

(d) 4,4'-oxydiphenylenedimethylene

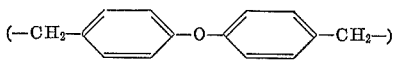

and (e) aliphatic radicals, containing up to 20 carbon atoms, which may be branched, unbranched, saturated or unsaturated cyclic or acyclic containing from 0 to 5 intralinear oxygen atoms.

2. A composition of claim 1 wherein $n$ is 1.

3. A composition of claim 1 wherein X is

—CH₂—Y—CH₂—

Y being a divalent radical.

4. A composition of claim 3 wherein Y is the divalent hydrocarbon radical —CH=CH—.

5. A composition of claim 3 wherein Y is the divalent hydrocarbon radical —CH₂CH₂—.

6. A composition of claim 3 wherein Y is the divalent hydrocarbon radical

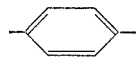

7. A composition of claim 3 wherein Y is the divalent radical —CH₂—O—CH₂—.

8. In a process for improving the ozone resistance of an elastomeric chloroprene polymer the step comprising incorporating therein, per 100 parts by weight of said polymer, about from 1 to 15 parts by weight of an alpha, omega-bis-cyclopentadienyl compound having the structure

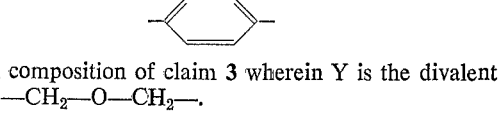

wherein $n$ is a number from 1 to 10 and X is a divalent carbon containing radical from the group consisting of (a) a,a'-p-xylylene

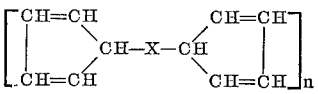

(b) a,a'-m-xylylene

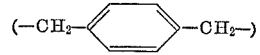

(c) 4,4'-biphenylenedimethylene

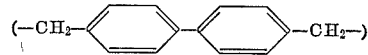

(d) 4,4'-oxydiphenylenedimethylene

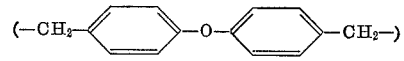

and (e) aliphatic radicals, containing up to 20 carbon atoms, which may be branched, unbranched, saturated or unsaturated cyclic or acyclic containing from 0 to 5 intralinear oxygen atoms.

References Cited

UNITED STATES PATENTS 3,428,691   2/1969   Spacht _____ 260—45.95

HOSEA E. TAYLOR, Primary Examiner

U.S. Cl. X.R.

260—45.7, 612, 614, 668